US012629965B2

(12) United States Patent
Koepke et al.

(10) Patent No.:  US 12,629,965 B2
(45) Date of Patent:      May 19, 2026

(54) PRE-CURED TREAD STONE REJECTION DESIGN

(71) Applicant: BRIDGESTONE BANDAG, LLC, Muscatine, IA (US)

(72) Inventors: Logan M. Koepke, Muscatine, IA (US); Terry A. Westaway, Muscatine, IA (US); Andrew D. Cerny, Muscatine, IA (US)

(73) Assignee: Bridgestone Bandag, LLC, Nashville, TN (US)

( * ) Notice: Subject to any disclaimer, the term of this patent is extended or adjusted under 35 U.S.C. 154(b) by 796 days.

(21) Appl. No.: 17/627,555

(22) PCT Filed: Jul. 16, 2020

(86) PCT No.: PCT/US2020/042253
§ 371 (c)(1),
(2) Date: Jan. 14, 2022

(87) PCT Pub. No.: WO2021/011728
PCT Pub. Date: Jan. 21, 2021

(65) Prior Publication Data
US 2022/0258542 A1      Aug. 18, 2022

Related U.S. Application Data

(60) Provisional application No. 62/875,136, filed on Jul. 17, 2019.

(51) Int. Cl.
*B60C 11/13*          (2006.01)
*B60C 11/04*          (2006.01)
*B60C 11/03*          (2006.01)

(52) U.S. Cl.
CPC .......... *B60C 11/1369* (2013.01); *B60C 11/04* (2013.01); *B60C 2011/0346* (2013.01); *B60C 2011/1361* (2013.01); *B60C 2200/06* (2013.01)

(58) Field of Classification Search
CPC ......... B60C 11/1369; B60C 2011/1361; B60C 2200/06
See application file for complete search history.

(56) References Cited

U.S. PATENT DOCUMENTS

| | | | |
|---|---|---|---|
| 3,706,334 | A | 12/1972 | Hoke |
| 3,727,661 | A | 4/1973 | Hoke |

(Continued)

FOREIGN PATENT DOCUMENTS

| | | |
|---|---|---|
| CN | 1712252 A | 12/2005 |
| CN | 101585298 A | 11/2009 |

(Continued)

OTHER PUBLICATIONS

International Search Report and Written Opinion for PCT Application No. PCT/US2020/042253, dated Oct. 30, 2020.

(Continued)

*Primary Examiner* — Katelyn W Smith
*Assistant Examiner* — Philip N Schwartz

(57)          ABSTRACT

Disclosed herein, a pneumatic tire having a tread portion is described. The tread portion includes a generally circumferentially extending groove defined therein. The groove has a groove cross-section defined by a groove bottom, a first groove sidewall, hand a second groove sidewall. The second groove sidewall is opposite and substantially parallel to the first groove sidewall. The groove has a groove width defined between the first groove sidewall and the second groove sidewall. A plurality of stone rejectors extend between the first groove sidewall and the second groove sidewall. Each stone rejector in the plurality of stone rejectors is circumferentially spaced from an adjacent stone rejector. Each stone rejector includes a raised platform and a protrusion. The raised platform extends axially from the first groove (Continued)

100

154

10

152 sidewall to the second groove sidewall. The protrusion extends from a top surface of the raised platform.

12 Claims, 7 Drawing Sheets

(56)                    References Cited

U.S. PATENT DOCUMENTS

| | | | |
|---|---|---|---|
| 4,345,632 | A | 8/1982 | Takigawa et al. |
| 5,115,850 | A | 5/1992 | Crump et al. |
| 5,373,881 | A | 12/1994 | Enoki |
| 5,975,172 | A | 11/1999 | Nakatsuji |
| 6,000,451 | A | 12/1999 | Takada |
| 7,703,491 | B2 | 4/2010 | Oyama |
| 7,921,891 | B2 | 4/2011 | Miyazaki |
| 8,408,260 | B2 | 4/2013 | Kawagoe |
| 9,452,643 | B2 | 9/2016 | Kiwaki et al. |
| 9,481,210 | B2 | 11/2016 | Iwabuchi et al. |
| 2006/0157179 | A1* | 7/2006 | Bito .................... B60C 11/0311 |
| | | | 152/209.19 |
| 2007/0056665 | A1* | 3/2007 | Parmentier .......... B60C 11/042 |
| | | | 152/209.15 |
| 2008/0078487 | A1 | 4/2008 | Ohara |
| 2009/0301622 | A1 | 12/2009 | Brown |
| 2010/0258228 | A1 | 10/2010 | De Benedittis |
| 2012/0018068 | A1 | 1/2012 | Kiwaki et al. |
| 2012/0287269 | A1 | 11/2012 | Berger |
| 2013/0098520 | A1 | 4/2013 | Kato |
| 2015/0306918 | A1* | 10/2015 | Kuwano ............... B60C 11/045 |
| | | | 152/209.22 |
| 2015/0360519 | A1* | 12/2015 | Kuwano ............. B60C 11/1353 |
| | | | 152/209.19 |
| 2016/0332491 | A1* | 11/2016 | Shmagranoff ...... B60C 11/1353 |
| 2017/0028790 | A1* | 2/2017 | Shmagranoff ...... B60C 11/0306 |
| 2017/0157990 | A1 | 6/2017 | Bortolet et al. |
| 2018/0201072 | A1 | 7/2018 | Fukuda |
| 2018/0290500 | A1 | 10/2018 | Yeo et al. |

FOREIGN PATENT DOCUMENTS

| | | |
|---|---|---|
| CN | 201970800 U | 9/2011 |
| CN | 202006702 U | 10/2011 |
| CN | 102300725 A | 12/2011 |
| CN | 202703142 U | 1/2013 |
| CN | 105073450 | 11/2015 |
| CN | 105960341 A | 9/2016 |
| CN | 206653869 U | 11/2017 |
| CN | 208812898 U | 5/2019 |
| EP | 0 413 502 A1 | 2/1991 |
| EP | 0 675 011 A1 | 10/1995 |
| EP | 2 234 824 A1 | 10/2010 |
| EP | 2 379 350 A1 | 10/2011 |
| GB | 2 326 387 A | 12/1998 |
| JP | 06-239107 A | 8/1994 |
| JP | 2001-030715 A | 2/2001 |
| JP | 2002-225510 A | 8/2002 |
| JP | 2004-224143 A | 8/2004 |
| JP | 2006-111216 A | 4/2006 |
| JP | 3822337 B2 | 9/2006 |
| JP | 2008-114824 A | 5/2008 |
| JP | 2008-296795 A | 12/2008 |
| JP | 2009-190469 A | 8/2009 |
| JP | 4318239 B2 | 8/2009 |
| JP | 2010-018049 A | 1/2010 |
| JP | 2010-184554 A | 8/2010 |
| JP | 2012-020702 A | 2/2012 |
| JP | 2012-040976 A | 3/2012 |
| JP | 2013-095189 A | 5/2013 |
| JP | 2013-144486 A | 7/2013 |
| KR | 1020040095473 A | 11/2004 |
| KR | 20070054965 | 5/2007 |
| KR | 1020100060943 A | 6/2010 |
| KR | 101069322 B1 | 10/2011 |
| KR | 101291986 B1 | 8/2013 |
| KR | 101480639 B1 | 1/2015 |
| KR | 101805307 B1 | 12/2017 |
| KR | 101840689 B1 | 3/2018 |
| KR | 101845719 B1 | 4/2018 |
| WO | WO-98/03357 A1 | 1/1998 |
| WO | WO-2013/115810 A1 | 8/2013 |
| WO | WO-2013/148355 A1 | 10/2013 |
| WO | WO-2015/119800 A1 | 8/2015 |
| WO | WO-2015/119801 A1 | 8/2015 |
| WO | WO-2016/003433 A1 | 1/2016 |
| WO | WO-2017/102118 A1 | 6/2017 |
| WO | WO-2017/102119 A1 | 6/2017 |
| WO | WO-2019/086153 | 5/2019 |

OTHER PUBLICATIONS

Office Action for CN Application No. 202080056809 dated Mar. 1, 2023.

EP Search Report for EP Application No. 20840084.6, dated Jul. 13, 2023.

* cited by examiner

PRE-CURED TREAD STONE REJECTION DESIGN

CROSS-REFERENCE TO RELATED PATENT APPLICATIONS

The present application is the U.S. National Stage of PCT Application No. PCT/US2020/042253, filed Jul. 16, 2020, which claims priority to U.S. Provisional Patent Application No. 62/875,136, filed Jul. 17, 2019, the contents of which are incorporated herein by reference in their entirety.

BACKGROUND

The present disclosure relates generally to the field of pneumatic tires, and more particularly, but not by way of limitation, to improved constructions for the stone rejectors located in the tread region of a tire.

One problem encountered in the use of pneumatic tires, and particularly for relatively large tires such as those referred to as truck and bus radial tires which are utilized on eighteen-wheeler trucks and on buses, is the entrapment of stones in the relatively large tread grooves of the tires. If a stone is trapped in the tread groove against the bottom of the tread groove, repeated impacting of the stone against the ground surface may cause the stone to cut into or drill into the bottom of the tread groove thus eventually reaching the structural members of the tire and degrading the strength and life of the tire.

There is a continuing need for improvement in the design and construction of such stone rejectors.

SUMMARY

In a first set of embodiments, a pneumatic tire having a tread portion is described. The tread portion includes a generally circumferentially extending groove defined therein. The groove has a groove cross-section defined by a groove bottom, a first groove sidewall, and a second groove sidewall. The second groove sidewall is opposite and substantially parallel to the first groove sidewall. The groove has a groove width defined between the first groove sidewall and the second groove sidewall. A plurality of stone rejecters extend between the first groove sidewall and the second groove sidewall. Each stone rejector in the plurality of stone rejectors is circumferentially spaced from an adjacent stone rejector. Each stone rejector includes a raised platform and a protrusion. The raised platform extends axially from the first groove sidewall to the second groove sidewall. The protrusion extends from a top surface of the raised platform.

In a second set of embodiments, a tread portion is described. The tread portion includes a generally circumferentially extending groove defined therein. The groove has a groove cross-section defined by a groove bottom, a first groove sidewall, and a second groove sidewall. The second groove sidewall is opposite and substantially parallel to the first groove sidewall. The groove has a groove width defined between the first groove sidewall and the second groove sidewall. A plurality of stone rejectors extend between the first groove sidewall and the second groove sidewall. Each stone rejector in the plurality of stone rejectors is circumferentially spaced from an adjacent stone rejector. Each stone rejector includes a raised platform and a protrusion. The raised platform extends axially from the first groove sidewall to the second groove sidewall. The protrusion extends from a top surface of the raised platform.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several implementations in accordance with the disclosure and are therefore, not to be considered limiting of its scope, the disclosure will be described with additional specificity and detail through use of the accompanying drawings.

Figure 1:
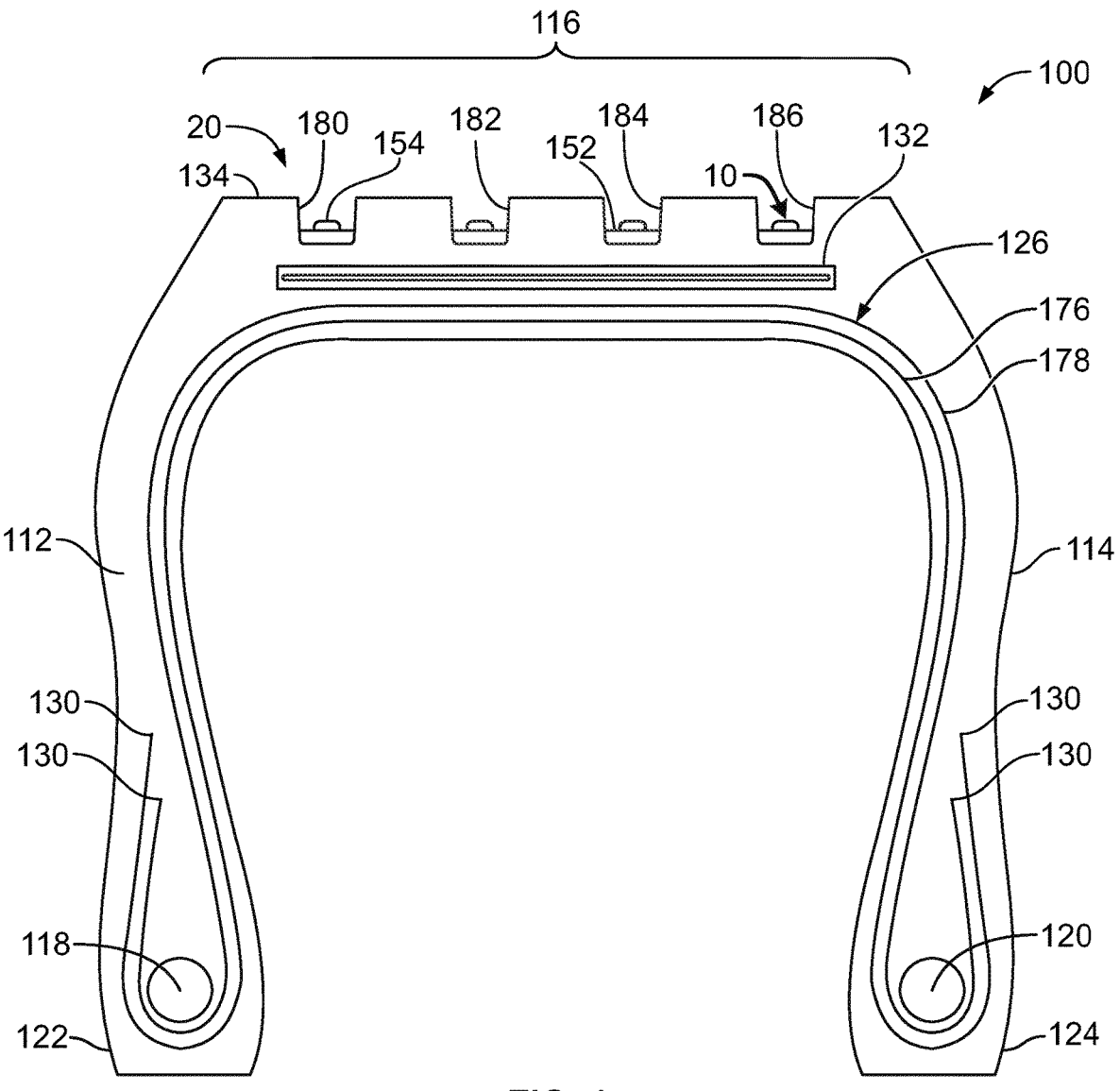
FIG. 1 is a schematic cross-section view of a pneumatic tire incorporating stone rejector protrusions on stone rejector ribs, according to an example embodiment.

Reference is made to the accompanying drawings throughout the following detailed description. In the drawings, similar symbols typically identify similar components, unless context dictates otherwise. The illustrative implementations described in the detailed description, drawings, and claims are not meant to be limiting. Other implementations may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and made part of this disclosure.

DETAILED DESCRIPTION

Embodiments described herein relate generally to a plurality of grooves along a tread portion of a pneumatic tire that include a plurality of stone rejectors, each with a stone rejector rib and a stone rejector protrusion formed thereupon. The stone rejectors are configured to impede and eject debris (e.g., stones, concrete, rocks, etc.) and foreign objects from entering the grooves early in the tire's life. Absent the plurality of stone rejector ribs and stone rejector protrusions along the grooves, the depth of the deep grooves of the tread portion allows for the stones to be held or trapped by the compression of the rubber in the sides or walls of the ribs formed by adjacent grooves. Eventually the stones are forced against the bottom of the groove by pressure of the load on the tire and road surfaces, thereby wearing or puncturing the tire.

Referring to FIG. 1, a schematic cross-section view is shown of a pneumatic tire 100. The tire 100 has first and second sidewalls 112 and 114. A circumferential tread area or tread portion 116 extends between the sidewalls. The term "circumferential" refers to the direction extending along the perimeter of the surface of the annular tread perpendicular to the axial direction, where the axial direction is the direction that is parallel to the axis of rotation of the tire 100, and the radial direction is perpendicular to the axis of rotation of a tire 100. First beads 118 and the second beads 120 are located in the first bead portions 122 and the second bead portions 124 of the first sidewall 112 and second sidewall 114, respectively. As used herein, the term "bead" or "bead core" refers to that part of a tire 100 comprising an annular tensile member, the bead core, wrapped by ply cords (e.g., continuous layer of rubber coated parallel cords) and shaped, with or without other reinforcement elements to fit a designed tire rim.

A carcass 126 including one or more body plies 176 and 178 extends through the tread portion 116, down through the sidewalls 112 and 114, and wraps around the beads 118 and 120 terminating in turn-up ends 130. As used herein, the term "carcass" 126 refers to the tire structure apart from the belt structure, tread, undertread, and sidewall rubber but including the beads, (carcass plies are wrapped around the beads). One or more circumferentially extending reinforcing belts, which may be generally referred to as a belt package 132, are placed in the tread portion 116 radially outside of the carcass 126.

The tread portion 116 includes a radially outer ground contacting surface 134 having a plurality of tread grooves 20, shown in FIG. 1 as a first tread groove 180, a second tread groove 182, a third tread groove 184, and a fourth tread groove 186. Each tread groove in the plurality of tread grooves 20 includes a plurality of stone rejectors 10, each with a raised platform 152 (e.g., stone rejector ribs) and a protrusion 154 (e.g., stone rejector protrusions). As discussed in greater detail below, each raised platform 152 in the plurality of raised platforms 152 includes a protrusion 154 and each raised platform 152 extends axially along the tread groove and spaced radially away from an adjacent raised platform. In some embodiments, the plurality of grooves 20 may have a groove depth 145 in unworn condition. The plurality of raised platforms 152 with the plurality of protrusions 154 may be implemented in a wide variety of groove widths and depth dimensions in the tread portion 116. For example, a tread groove from the plurality of tread grooves 20 located at or near the center of the tread portion 116 may be wider or narrower, deeper or shallower than the grooves located at or near the outer edges (e.g., proximate to the sidewalls 112, 114) of the tire tread portion 116.

Figure 2:
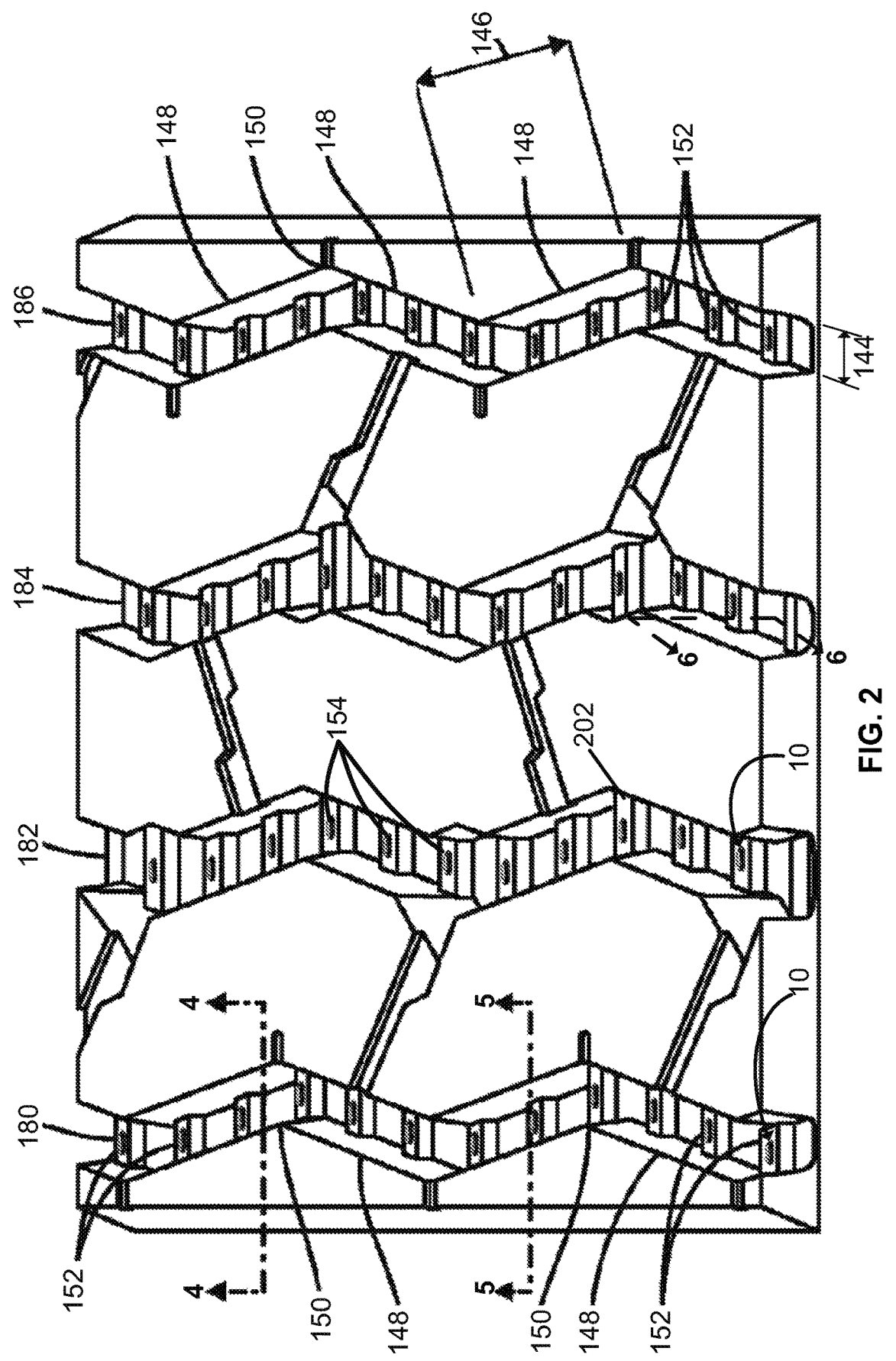
FIG. 2 is a perspective view of the tread region of the tire of FIG. 1.
Figure 4:
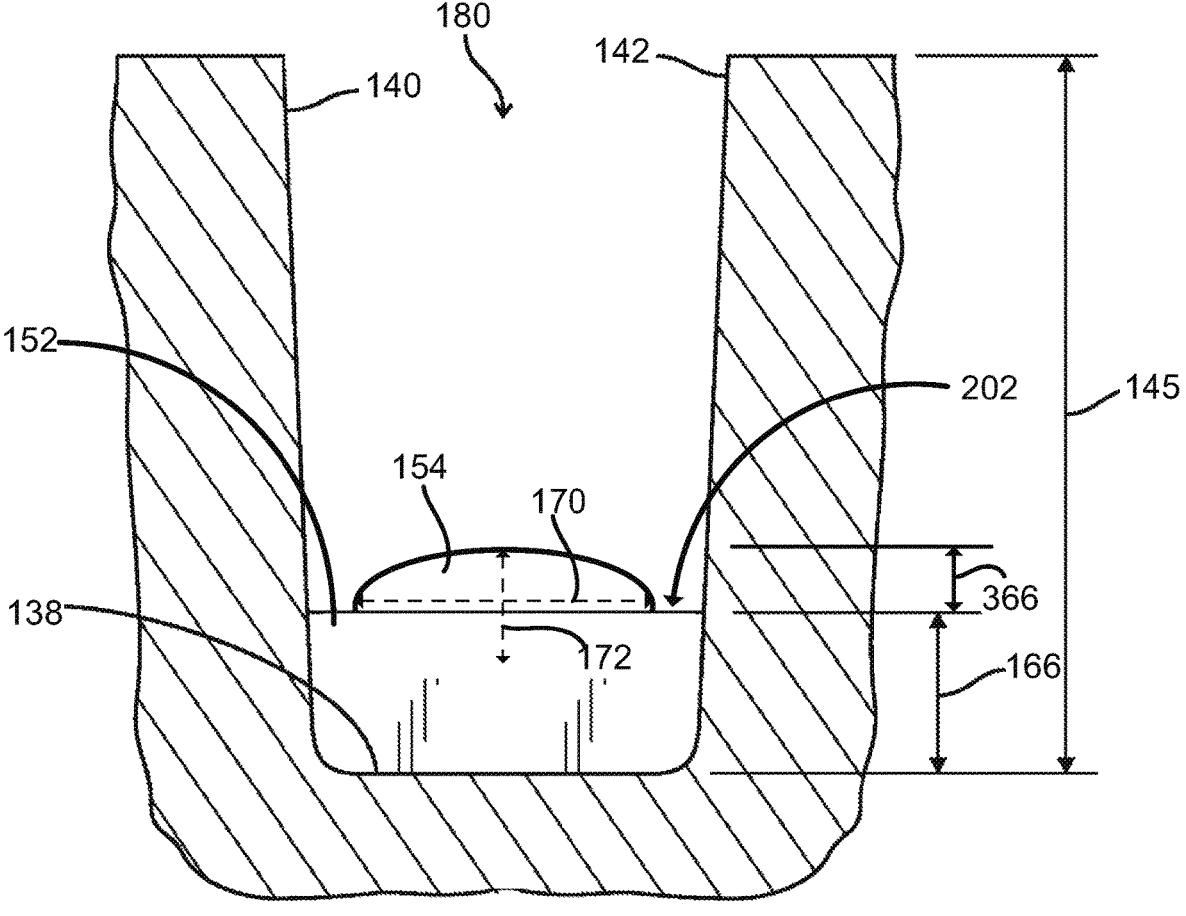
FIG. 4 is a schematic cross-sectional view of a tread groove along lateral line 4-4 of FIG. 2.

As shown in FIGS. 2 and 4, each tread groove in the plurality of tread grooves 20 includes a groove bottom 138, a first groove sidewall 140, and a second groove sidewall 142. Each groove in the plurality of grooves 20 has a groove width 144 defined as a shortest width between the first groove sidewall 140 and the second groove sidewall 142. Relatedly, each groove in the plurality of tread grooves 20 has a groove length 146 extending generally parallel to the first groove sidewall 140 and the second groove sidewall 142. Each groove in the plurality of grooves 20 extends generally circumferentially around the circumference of the tire 100. As shown in FIG. 2, each groove in the plurality of grooves 20 extends circumferentially around the tire 100 in a zig-zag pattern including alternating straight portions 148 joined at obtuse corners 150. With respect to zig-zag grooves 20, the groove length 146 may be defined along each of the straight portions 148.

Figure 3:
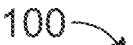
FIG. 3 is a perspective view of a tread region and a stone rejector protrusion on the stone rejector ribs, according to another example embodiment.
Figure 3:
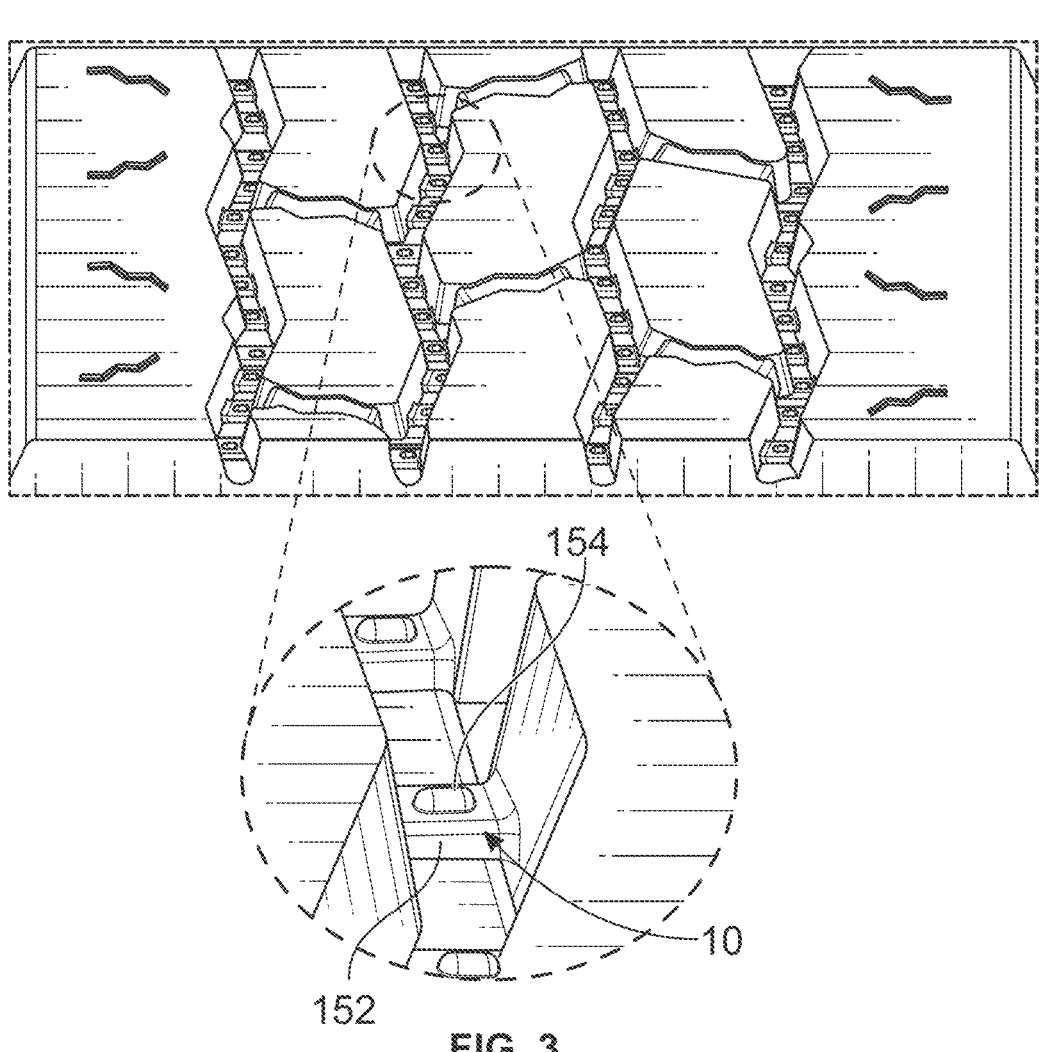

While the shape of the plurality of grooves 20 is shown in FIGS. 2 and 3 as a zig-zag shape, a wide variety of shapes and patterns may be implemented as the groove pattern. For example, in some embodiments, the plurality of grooves 20 may be completely straight grooves running in a straight fashion circumferentially around the entire circumference of the tire 100. In other embodiments, the plurality of grooves 20 may have a wavy or alternative zig-zag shape. In general, the length of the groove in the plurality of grooves 20 refers to a line generally parallel to (e.g., paralleling) the sidewalls 140, 142 of the groove and extending generally around the circumference of the tire 100.

Referring to FIG. 2, a zig-zag shaped plurality of grooves 20 is shown. Each of the first tread groove 180, second tread groove 182, third tread groove 184, and fourth tread groove 186 form alternatingly-angled parallel walls that include a sequence or row of stone rejectors 10. Each stone rejector 10 in the plurality of grooves 20 is circumferentially spaced apart along the groove length 146. Each of the raised platforms 152 spans between the first groove sidewall 140 and the opposed second groove sidewall 142 and extends upward from the groove bottom 138 (e.g., away from the body plies 176). Each raised platform 152 is substantially parallel to an adjacent raised platform 152 along the groove length 146 of the groove 20. Each protrusion 154 extends from the top surface 202 of the raised platform 152 in an elliptical shape (e.g., capsule) such that a top portion 310 of the elliptical shape is exposed.

As shown in FIG. 3, each stone rejector 10 may have a row or sequence circumferentially spaced apart along the groove length 146. In some embodiments, the stone rejectors 10 may be angled with respect to the rotational axis of the tire 100 and still provide substantially the same function as described herein. For example, the raised platform 152 may extend from the first groove sidewall 140 toward the second groove sidewall 142 at an angle of plus or minus 20-degrees to the rotational axis of the tire 100. Additionally, the protrusion 154 may be positioned on the top surface 200 at an angle of plus or minus 20-degrees with respect to the sidewall of the raised platform 152. In some embodiments, the protrusion 154 may be a spherocylinder (e.g., capsule-shaped) with only a top portion of the spherocylinder exposed and protruding from the raised platform 152. In those embodiments, the protrusion 154 is a three-dimensional shape that includes a cylinder with hemispherical ends and has a surface area of $2\pi(2r+a)$ where "a" is the length between the two spheres and "r" is the radius of the respective half spheres. A range of forty-percent to eighty-percent (e.g., 40%-80%) of the surface area may be exposed along the top surface 202 of the raised platform 152.

As seen in FIG. 2, the raised platform 152 may extend across one of the plurality of tread grooves 20 (e.g., the first tread groove 180, the second tread groove 182, the third tread groove 184, the fourth tread groove 186, etc.) in a direction substantially parallel to a rotational axis of the tire 100. The raised platform 152 may also extend across one of the plurality of tread grooves 20 parallel to each other. While it is preferred that the raised platform 152 extend parallel to the rotational axis of the tire 100, it will be appreciated that the raised platform 152 could be placed at a small angle to the rotational axis of the tire 100 and still provide substantially the same function as described herein. For example, the raised platform 152 slanted at an angle of plus or minus 20-degrees to the rotational axis of the tire 100 would still result in a functional raised platform (e.g., stone rejector rib).

Figure 5:
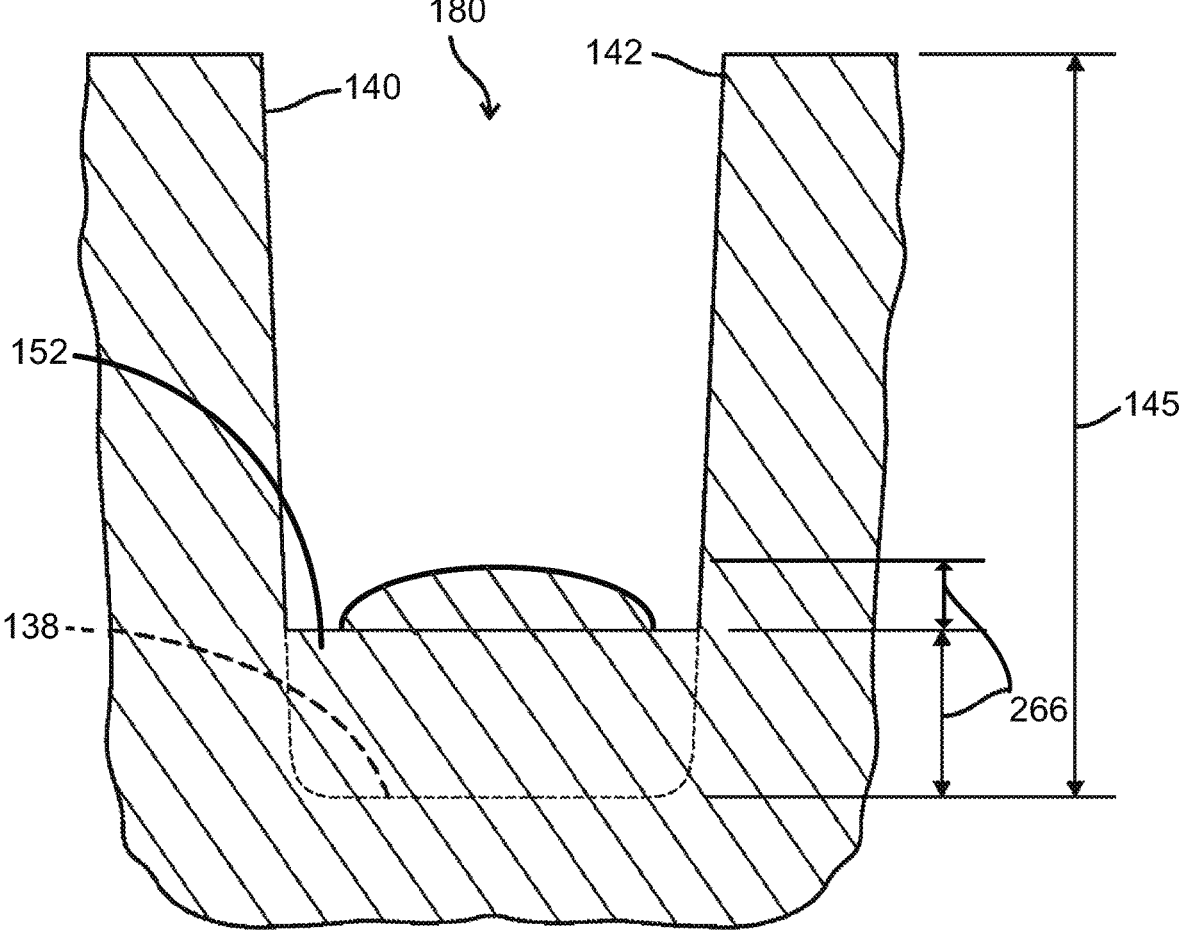
FIG. 5 is a schematic cross-sectional view of a tread groove along lateral line 5-5 of FIG. 2.

Referring to FIGS. 4 and 5, a cross-sectional view of the first tread groove 180 along the lateral line 4-4 of FIG. 2 and the lateral line 5-5 of FIG. 2, respectively, is shown. The raised platform 152 extends axially (e.g., laterally) between the first groove sidewall 140 and the second groove sidewall 142. In some embodiments, the platform width is equal to the groove width 144. The raised platform 152 extends in the radial direction away from and out of the groove bottom 138 to a platform height 166. In some embodiments, the raised platform 152 extends away from the groove bottom 138 in a direction substantially perpendicular to the groove bottom 138. In some embodiments, the platform height 166 may be between 2% and 75% of the groove depth 145. In some embodiments, the platform height 166 is between 5% and 70% of the groove depth 145. In some embodiments, the platform height 166 is approximately 20% of the groove depth 145. As shown in FIG. 4, the platform height 166 is 1% to 75% of the groove depth 145. In some embodiments, the groove depth 145 and the groove width 144 are dependent on tread design. In some embodiments, the platform height 166 may be in a range of from about 1 mm to about 10 mm. In some embodiments, the platform height 166 may be in a range of from about 3 mm to about 7 mm. As shown in FIG. 4, the platform height 166 is approximately 3 mm, the unworn groove depth 145 is approximately 22 mm, and the groove width 144 is approximately 12 mm.

The protrusion 154, as shown in FIG. 4, may be elliptical shaped (e.g., elongated rounded shaped) defined by a major axis 170 and a minor axis 172. While the protrusion 154 is described as "elliptical," the protrusion 154 may also more generally include an elongated shape having rounded ends and need not be precisely elliptical. The protrusion 154 extends axially along the top surface 202 of the raised platform 152 and is substantially centered along the top surface 202 such that the major axis 170 is substantially parallel to the groove bottom 138 and substantially perpendicular to the first groove sidewall 140 and the second groove sidewall 142. In some embodiments, the protrusion 154 includes a more pronounced curvature along the circumference (e.g., the vertex and co-vertex are closer together), while in other embodiments, the protrusion 154 includes a softer curvature along the circumference (e.g., the vertex and co-vertex are further apart).

The protrusion 154 extends in the radial direction away from and out of the groove bottom 138 to a protrusion height 366. Generally, the protrusion height 366 is substantially similar to half the minor axis 172 (e.g., the protrusion height 366 is substantially half of the length of the minor axis 172). However, in some embodiments, the protrusion height 366 may be greater or less than the length of the minor axis 172 as more or less of the elliptical-shape is exposed—or left on during formation—to provide more surface area along the top surface 202 of the raised platform 152 to reject stones. In some embodiments, the protrusion 154 has a periphery that is entirely smooth and free of any abrupt changes in tangential direction (e.g., no sharp corners). The protrusion height 366 may be in a range of about 1 mm to about 4 mm. In some embodiments, the protrusion height 366 is in a range of from about 2 mm to about 3 mm. In some embodiments, the protrusion 154 and the raised platform 152 are pre-cured with the tread portion 116. In some embodiments, the protrusion 154 and the raised platform 152 are a part of the groove mold. In some embodiments, the protrusion height 366 is 1% to 40% of the groove depth 145. In some embodiments, the width of the protrusion 154 (e.g., the length of the major axis 170) is between 5% and 95% of the groove width 144. In some embodiments, the width of the protrusion 154 is between 70% and 90% of the groove width 144.

Referring to FIG. 5, the stone rejector height 266 is equal to the sum of the protrusion height 366 and the platform height 166. Generally speaking, the stone rejectors 10 are applied to the groove bottom 138 and are configured to prevent stones from being held by (e.g., wedged within, stuck in, etc.) the groove 20 and potentially begin to drill (e.g., cut, penetrate) into the belts (e.g., belt package 132) of the tire 100. The raised platforms 152 are fully attached to the groove sidewalls 140 and 142 to provide extra stiffness, which will help keep the raised platforms 152 from being displaced by larger stones that have a higher potential to drill into the groove bottom 138 of the grooves 20. Placing the stone rejectors 10 in a radial pattern (e.g., substantially parallel to the rotational axis of the tire 100) allows the circumferential spaces between the stone rejectors 10 to open and close as the tire rolls through its footprint on the ground surface, making it harder for a larger stone to get held in the area between the raised portions 152. Additionally, the protrusion 154 provides an additional surface that can contact and reject stones from entering the grooves 20. As the tire rolls out of its footprint on the ground surface, and the space between the raised portions 152 and the protrusions 154 opens up again, any smaller stone that may have been able to fit in while the space was closed up will be able to fall out. As the tire 100 rolls through its footprint, the protrusions 154 and top surface 202 of the raised platforms 152 are compressed toward each other slightly, and as the tire rolls out of its footprint the protrusions 154 and top surface 202 of the raised platforms 152 spring back away from each other to their original shape. The angle of the raised platform sidewalls and protrusion and the spacing between adjacent stone rejectors 10 causes the circumferential gap between stone rejector 10 to act like a mini-groove to provide an area that is less likely to hold stones than a typical grooved bottom.

Figure 6:
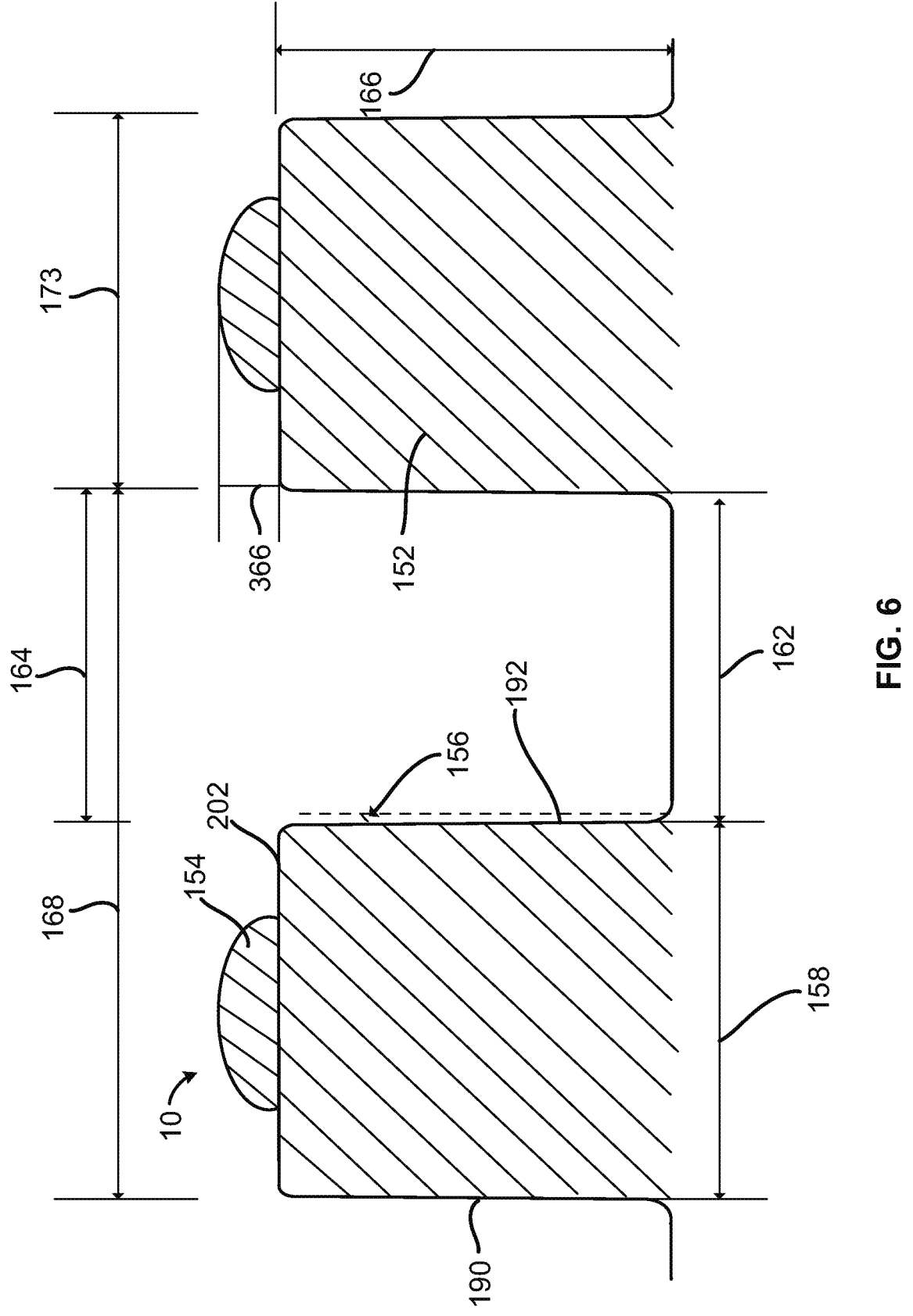
FIG. 6 is a schematic cross-sectional view tread groove along radial line 6-6 of FIG. 2.

As shown in FIG. 6, each stone rejector 10 includes a raised platform 152 and a protrusion 154 along the top surface 202 of the raised platform 152. Each stone rejector 10 in the plurality of stone rejectors 10 may be equally circumferentially spaced around the circumference of the tire 100. Raised platforms 152 of adjacent stone rejectors 10 may be spaced apart at a pitch spacing 168 in a range of between 10% and 300% of the groove width 144.

In some embodiments, adjacent stone rejectors 10 are spaced apart at the platform base 158 (e.g., length of the raised platform 152) by a base spacing 162, in some embodiments no greater than the groove width 144. At the platform top surface 202, adjacent stone rejectors 10 are spaced apart by a top spacing 164 equal to or greater than the groove width 144. Such dimensioning of the stone rejectors 10 relative to the groove width 144 provides that opposed stone rejector sidewalls (e.g., first sidewall 190 and second sidewall 192) of adjacent stone rejectors 10 will resist retention between the adjacent stone rejectors 10 of stone having dimensions equal to or greater than the groove width 144.

Each raised platform 152 includes a circumferentially facing first sidewall 190 and a circumferentially facing second sidewall 192. The first sidewall 190 and the second sidewall 192 are sloped at an angle 156 with respect to a radius of the tire 100 such that the first sidewall 190 is a forward facing sloped rejector wall and the second sidewall 192 is a rearward facing sloped rejector wall. The angle 156 may be in a range of about 0-degrees to about 10-degrees with respect to the radius of the tire 100. In other embodiments, the angle 156 is in a range of from about 0-degrees to about 25-degrees. As shown in FIG. 6, each raised platform 152 will have a wider platform base 158 and a narrow platform top surface 202. Accordingly, the raised platform 152 may be described as rectangular in cross-section or as substantially vertical from the platform base 158 to the platform top surface 202. In some embodiments, the platform top surface 202 has a width 173 in a range from 1 mm to 8 mm. In other embodiments, the platform top surface 202 has a width 173 in the range of 2 mm to 3 mm.

In some embodiments, the protrusion 154 may be formed by removing a top excess surface from the triangular shape 110 of the raised platform 152. The triangular shape 110 is the extending first sidewall 190 meeting the second sidewall 192 at a point. In other embodiments, the protrusion 154 and the raised platform 152 are formed as a single mold. In one example embodiment, the platform height 166 is approximately 6 mm, the protrusion height is approximately 1 mm, the angle 156 is approximately 5°, the unworn groove depth 145 is approximately 19 mm, the groove width 144 is approximately 10 mm, the top spacing 164 is approximately 10.2 mm, and the pitch spacing 168 is approximately 11.6 mm.

Figure 7:
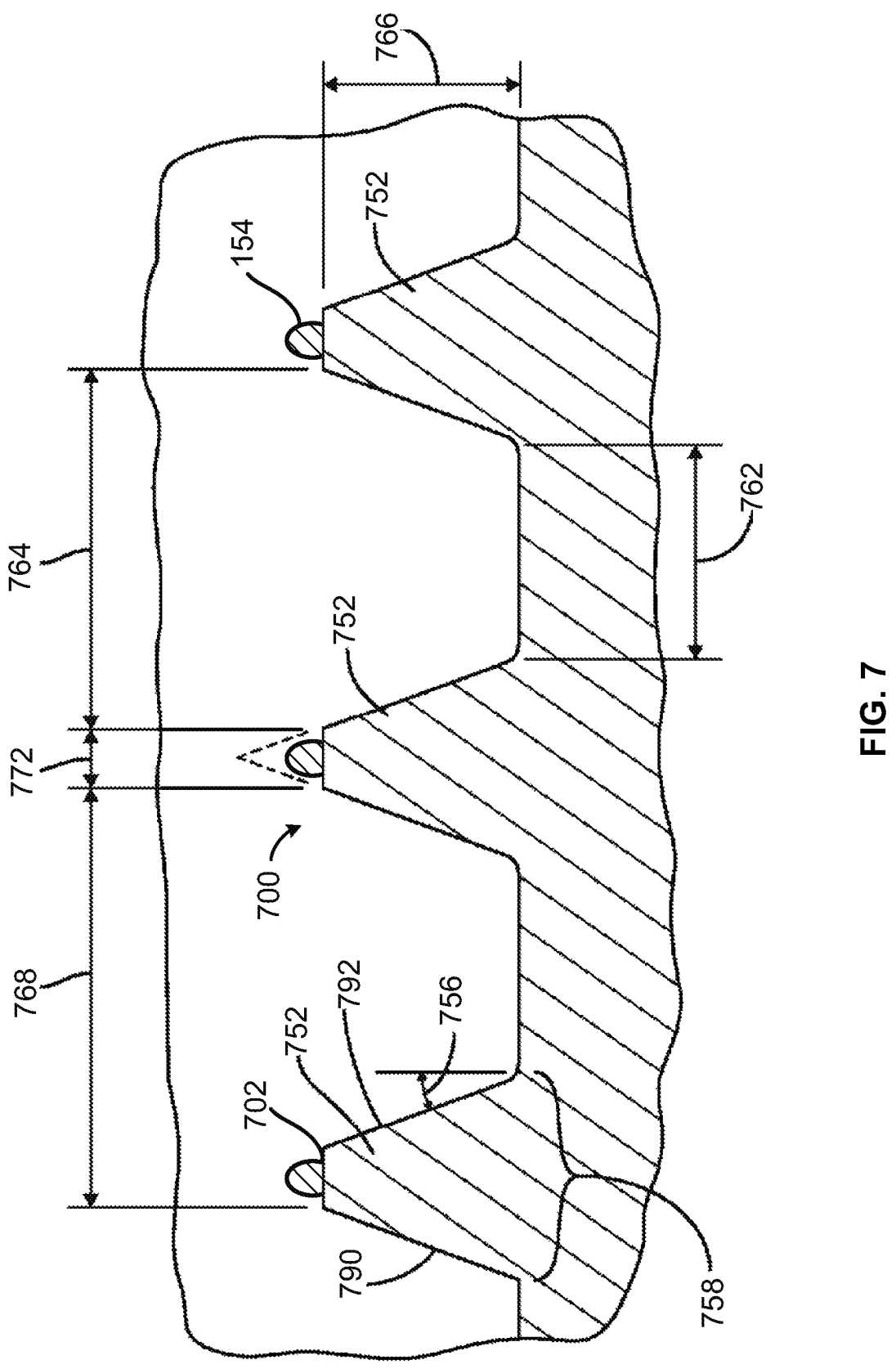
FIG. 7 is a schematic cross-sectional view tread groove along radial line 6-6 of a tread region with angled raised platforms, according to an example embodiment.

Turning to FIG. 7, a schematic cross-sectional view tread groove along radial line 6-6 of a tread region with angled raised platforms 752 is shown, according to an example embodiment. The plurality of stone rejectors 700 is similar to the plurality of stone rejectors 10 of FIGS. 1-6. A difference between the plurality of stone rejectors 700 and the plurality of stone rejectors 10 is the plurality of stone rejectors 700 includes angled sidewalls along the raised platforms 752. Accordingly, similar numbering will be used for similar features of the plurality of stone rejectors 700 and the plurality of stone rejectors 10. Each stone rejector 700 includes a raised platform 752 and a protrusion 154 along the top surface 702 of the raised platform 752. Each stone rejector in the plurality of stone rejectors 700 may be equally circumferentially spaced around the circumference of the tire 100. Raised platforms 752 of adjacent stone rejectors 700 may be spaced apart at a pitch spacing 768 in a range of between 100% and 250% of the groove width 144.

In some embodiments, adjacent stone rejectors 10 are spaced apart at the platform base 758 by a base spacing 762, in some embodiments no greater than the groove width 144. At the top surface 702, adjacent stone rejectors 10 are spaced apart by a top spacing 764 equal to or greater than the groove width 144. Such dimensioning of the stone rejectors 10 relative to the groove width 144 provides that opposed stone rejector sidewalls (e.g., first sidewall 790 and second sidewall 792) of adjacent stone rejectors 10 will resist retention between the adjacent stone rejectors 10 of stone having dimensions equal to or greater than the groove width 144.

Each raised platform 752 includes a circumferentially facing sloped first sidewall 790 and a circumferentially facing sloped second sidewall 792. The first sidewall 790 and the second sidewall 792 are sloped at an angle 756 with respect to a radius of the tire 100 such that the first sidewall 790 is a forward facing sloped rejector wall and the second sidewall 792 is a rearward facing sloped rejector wall. The angle 756 may be in a range of about 10-degrees to about 30-degrees with respect to the radius of the tire 100. In other embodiments, the angle 756 is in a range of from about 15-degrees to about 25-degrees. As shown in FIG. 7, the angle 756 is approximately 20-degrees. As shown in FIG. 7, each raised platform 752 will have a wider platform base 758 and a narrow top surface 702. Accordingly, the raised platform 752 may be described as pyramidal in cross-section or as vertically tapered from the platform base 758 to the top surface 702. In some embodiments, the top surface 702 has a width 772 in a range from 1 mm to 5 mm. In other embodiments, the top surface 702 has a width 772 in the range of 2 mm to 3 mm.

In some embodiments, the protrusion 154 may be formed by removing a top excess surface from the triangular shape 770 of the raised platform 752. The triangular shape 770 is the extending first sidewall 790 meeting the second sidewall 792 at a point. In other embodiments, the protrusion 154 and the raised platform 152 are formed as a single mold. In one example embodiment, the platform height 766 is approximately 6 mm, the angle 756 is approximately 20°, the unworn groove depth is approximately 19 mm, the groove width 144 is approximately 10 mm, the top spacing 764 is approximately 10.2 mm, and the pitch spacing 768 is approximately 11.6 mm.

It should be noted that the term "example" as used herein to describe various embodiments is intended to indicate that such embodiments are possible examples, representations, and/or illustrations of possible embodiments (and such term is not intended to connote that such embodiments are necessarily extraordinary or superlative examples).

As utilized herein, the term "substantially" and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed (e.g., within plus or minus five percent of a given angle or other value) are considered to be within the scope of the disclosure as recited in the appended claims. The term "approximately" when used with respect to values means plus or minus five percent of the associated value.

Directions are also stated in this application with reference to the axis of rotation of the tire. The terms "upward" and "upwardly" refer to a general direction towards the tread of the tire, whereas "downward" and "downwardly" refer to the general direction towards the axis of rotation of the tire. Thus, when relative directional terms such as "upper" and "lower" are used in connection with an element, the "upper" element is spaced closer to the tread than the "lower" element. Additionally, when relative directional terms such as "above" or "below" are used in connection with an element, an element that is "above" another element is closer to the tread than the other element. Additionally, the term "radially inner" refers to an element that is closer to the axis of rotation than is a "radially outer" element. The terms "axially inward" and "axially inwardly" refer to a general direction towards the equatorial plane of the tire, whereas "axially outward" and "axially outwardly" refer to a general direction away from the equatorial plane of the tire and towards the sidewall of the tire.

The terms "coupled," "connected," and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

It is important to note that the construction and arrangement of the various exemplary embodiments are illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. Other substitutions, modifications, changes and omissions may also be made in the design, operating conditions and arrangement of the various exemplary embodiments without departing from the scope of the embodiments described herein.

While this his specification contains many specific implementation details, these should not be construed as limitations on the scope of any embodiment or of what may be claimed, but rather as descriptions of features specific to particular implementations of particular embodiments. Certain features described in this specification in the context of separate implementations can also be implemented in combination in a single implementation. Conversely, various features described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

What is claimed is:

1. A pneumatic tire comprising:
a tread portion comprising a generally circumferentially extending groove defined therein, the groove having a groove cross-section defined by a groove bottom, a first groove sidewall, and a second groove sidewall, the second groove sidewall opposite and substantially parallel to the first groove sidewall, the groove having a groove width defined between the first groove sidewall and the second groove sidewall; and
a plurality of stone rejectors extending between the first groove sidewall and the second groove sidewall, each stone rejector in the plurality of stone rejectors circumferentially spaced from an adjacent stone rejector, wherein each stone rejector comprises a raised platform and a protrusion, the raised platform extending axially from the first groove sidewall to the second groove sidewall and the protrusion extending from a top surface of the raised platform, wherein a footprint of the raised platform extends beyond an entirety of the footprint of the protrusion such that a perimeter of the footprint of the protrusion is surrounded by a perimeter of the raised platform, and wherein the protrusion is shaped as a portion of a spherocylinder, the portion of the spherocylinder comprising a cylindrical segment having a length extending between two ends in a direction substantially perpendicular to the first groove sidewall and a semi-hemispherical segment at each end of the cylindrical segment.

2. The pneumatic tire of claim 1, the raised platform comprising a first platform wall extending axially from the first groove sidewall to the second groove sidewall, a second platform wall extending axially from the first groove sidewall to the second groove sidewall, the first platform wall circumferentially disposed from and parallel to the second platform wall, and a platform base adjacent the groove bottom and extending from the first platform wall circumferentially toward the second platform wall, wherein the top surface is radially spaced from groove bottom and extends from the first platform wall circumferentially to the second platform wall.

3. The pneumatic tire of claim 2, wherein the first platform wall is sloped at a slope angle in a range of from about 0-degrees to about 5-degrees to a radius of the pneumatic tire and the second platform wall is at a slope angle in the range of from about 0-degrees to about 5-degrees to the radius of the pneumatic tire, such that the platform base of each raised platform is wider than the top surface of the raised platform.

4. The pneumatic tire of claim 2, wherein the first platform wall is sloped at a slope angle in a range of from about 10-degrees to about 30-degrees to a radius of the pneumatic tire and the second platform wall is at a slope angle in the range of from about 10-degrees to about 30-degrees to the radius of the pneumatic tire, such that the platform base of each raised platform is wider than the top surface of the raised platform.

5. The pneumatic tire of claim 2, wherein a platform base length is defined by a distance between the first platform wall and the second platform wall, and wherein a length of the top surface of the raised platform is substantially similar to the platform base length.

6. The pneumatic tire of claim 2, wherein the first platform wall and the groove bottom are joined by a first curved surface and wherein the second platform wall and the groove bottom are joined by a second curved surface, wherein the first curved surface and the second curved surface are mirrored about a radial axis through a center of the platform base.

7. The pneumatic tire of claim 1, wherein the protrusion has a different shape and size from the raised platform, and wherein the protrusion is centered along the top surface of the raised platform.

8. A tread portion comprising:
a generally circumferentially extending groove defined therein, the groove having a groove cross-section defined by a groove bottom, a first groove sidewall, and a second groove sidewall, the second groove sidewall opposite and substantially parallel to the first groove sidewall, the groove having a groove width defined between the first groove sidewall and the second groove sidewall; and
a plurality of stone rejectors extending between the first groove sidewall and the second groove sidewall, each stone rejector in the plurality of stone rejectors circumferentially spaced from an adjacent stone rejector, wherein each stone rejector comprises a raised platform and a protrusion, the raised platform extending axially from the first groove sidewall to the second groove sidewall and the protrusion extending from a top surface of the raised platform, wherein a footprint of the raised platform extends beyond an entirety of the footprint of the protrusion such that a perimeter of the footprint of the protrusion is surrounded by a perimeter of the raised platform, and wherein the protrusion is shaped as a portion of a spherocylinder, the portion of the spherocylinder comprising a cylindrical segment having a length extending between two ends in a direction substantially perpendicular to the first groove sidewall and a semi-hemispherical segment at each end of the cylindrical segment.

9. The tread portion of claim 8, wherein the raised platform comprises a first platform wall extending axially from the first groove sidewall to the second groove sidewall, a second platform wall extending axially from the first groove sidewall to the second groove sidewall, the first platform wall circumferentially disposed from and parallel to the second platform wall, and a platform base adjacent the groove bottom and extending from the first platform wall circumferentially toward the second platform wall, wherein the top surface is radially spaced from the groove bottom and extends from the first platform wall circumferentially to the second platform wall.

10. The tread portion of claim 9, wherein the first platform wall is sloped at a slope angle in a range of from about 0-degrees to about 5-degrees with respect to a first radial axis defined between the first platform wall and the groove bottom, and the second platform wall is at a slope angle in the range of from about 0-degrees to about 5-degrees with respect to a second radial axis defined between the second platform wall and the groove bottom, such that the platform base of each raised platform is wider than the top surface of the raised platform.

11. The tread portion of claim 9, wherein the first platform wall is sloped at a slope angle in a range of from about 10-degrees to about 30-degrees with respect to a first radial axis defined between the first platform wall and the groove bottom, and the second platform wall is at a slope angle in the range of from about 10-degrees to about 30-degrees with respect to a second radial axis defined between the second platform wall and the groove bottom, such that the platform base of each raised platform is wider than the top surface of the raised platform.

12. The tread portion of claim 9, wherein the first platform wall and the groove bottom are joined by a first curved surface and wherein the second platform wall and the groove bottom are joined by a second curved surface, wherein the first curved surface and the second curved surface are mirrored about a radial axis through a center of the platform base.

\* \* \* \* \*